United States Patent [19]

Suckewer et al.

[11] Patent Number: 4,771,430
[45] Date of Patent: Sep. 13, 1988

[54] ENHANCEMENT OF SOFT X-RAY LASING ACTION WITH THIN BLADE RADIATORS

[75] Inventors: Szymon Suckewer, Princeton Junction; Charles H. Skinner, Kingston; David R. Voorhees, Hopewell, all of N.J.

[73] Assignee: Princeton University, Princeton, N.J.

[21] Appl. No.: 758,469

[22] Filed: Jul. 24, 1985

[51] Int. Cl.⁴ ............................................. H01S 3/30
[52] U.S. Cl. ......................................... 372/5; 372/37; 372/34; 372/76
[58] Field of Search .................. 372/5, 76, 78, 37, 34

[56] References Cited

U.S. PATENT DOCUMENTS

| | | | |
|---|---|---|---|
| 3,746,860 | 7/1973 | Shatas et al. | 372/5 |
| 3,826,996 | 7/1974 | Jaegle et al. | 372/5 |
| 3,961,197 | 6/1976 | Dawson | 372/5 |
| 4,143,275 | 3/1979 | Mallozzi et al. | 250/503 |
| 4,229,708 | 10/1980 | Mani et al. | 372/5 |
| 4,504,964 | 3/1985 | Cartz et al. | 372/5 |

OTHER PUBLICATIONS

Suckewer et al., "Population Inversion and Gain Measurement for Soft X-Ray Laser Development in a Magnetically Confined Plasma Column", IEEE, Journal of Quantum Electronics, vol. Q.E-19, No. 12, Dec. 1983, pp. 1855-1859.

Primary Examiner—William L. Sikes
Assistant Examiner—Georgia Y. Epps
Attorney, Agent, or Firm—Richard C. Woodbridge

[57] ABSTRACT

An enhancement of approximately 100 of stimulated emission over spontaneous emission of the CVI 182 Angstrom line was obtained in a recombining magnetically confined plasma column. The plasma was formed by focusing a $CO_2$ laser beam on a carbon disc. A magnetic solenoid produced a strong magnetic field which confined the plasma to the shape of a column. A single thin carbon blade extended parallel to the plasma column and served to make the column axially more uniform and also acted as a heat sink. Axial and transverse measurements of the soft X-ray lasing action were made from locations off-set from the central axis of the plasma column. Multiple carbon blades located at equal intervals around the plasma column were also found to produce acceptable results. According to another embodiment 10 a thin coating of aluminum or magnesium was placed on the carbon disc and blade. The Z of the coating should preferably be at least 5 greater than the Z of the target. Measurements of the soft X-rays generated at 182 Angstroms showed a significant increase in intensity enhancement.

18 Claims, 6 Drawing Sheets

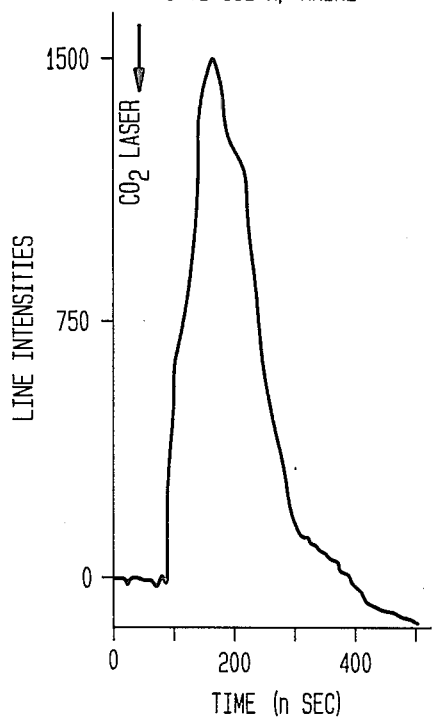
FIG. 9A
C VI 182 Å; AXIAL
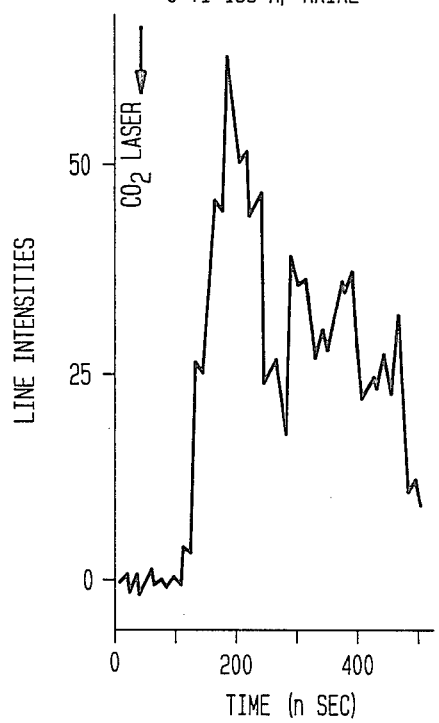
FIG. 9B
C VI 135 Å; AXIAL
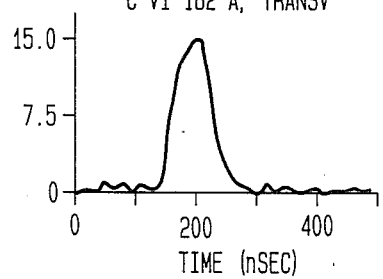
FIG. 9C
C VI 182 Å; TRANSV
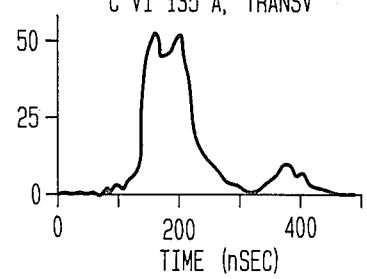
FIG. 9D
C VI 135 Å; TRANSV
FIG. 9E
$$E = \frac{I(182)_{AXIAL}}{I(182)_{TRANSV.}} \bigg/ \frac{I(135)_{AXIAL}}{I(135)_{TRANSV.}} \approx 100$$

FIG. 10A
C VI 182 Å; AXIAL
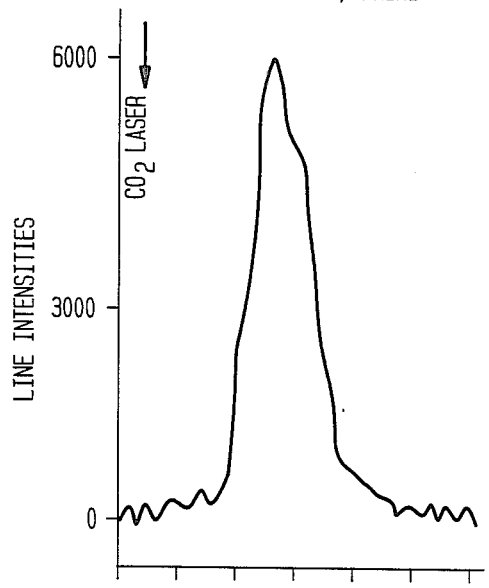
FIG. 10B
C VI 135 Å; AXIAL
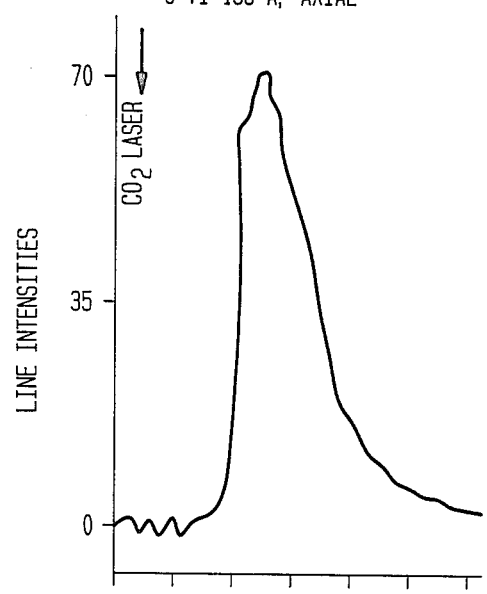
FIG. 10C
C VI 182 Å; TRANSV
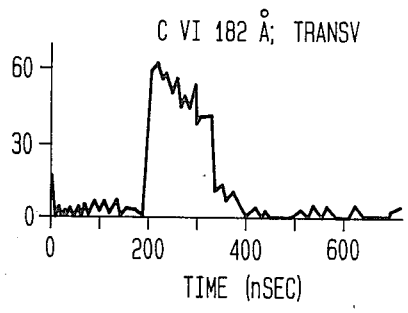
FIG. 10D
C VI 135 Å; TRANSV
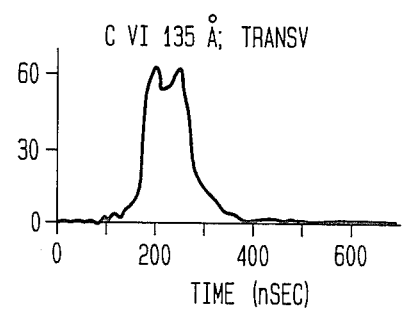
FIG. 10E
$$E = \frac{I(182)_{AXIAL}}{I(182)_{TRANSV.}} \bigg/ \frac{I(135)_{AXIAL}}{I(135)_{TRANSV.}} \approx 95$$

ENHANCEMENT OF SOFT X-RAY LASING ACTION WITH THIN BLADE RADIATORS

GOVERNMENT RIGHTS

This invention was made with Government support under U.S. Department of Energy Basic Energy Sciences Grant No. KC-05-01 and Air Force Office of Scientific Research Grant No. AFOSR-84-0025.

BACKGROUND OF THE INVENTION

1. Field of the Invention

The invention comprises a method and apparatus for generating soft X-ray laser action through the use of thin blades which help to remove heat from a magnetically confined plasma.

2. Description of the Prior Art

The possibility of producing a soft X-ray laser has attracted recent attention because of the interesting scientific potential for such a device. It is believed that an X-ray laser would have the capability of forming holographic interference images which could, for example, be used to study the detailed three dimensional structure of small molecules such as DNA. Other significant applications are anticipated. The potential for X-ray lasers is described in the Oct. 30, 1982 editions of THE NEWARK STAR LEDGER and THE WALL STREET JOURNAL as well as the Apr. 2, 1985 edition of The NEW YORK TIMES.

Experimental efforts have focused on a population inversion in CVI in a recombining plasma. The principle of the recombination technique is, first, to create and heat a multi-Z high density plasma in order to ionize atoms to the proper stage of ionization and, second, to cool the plasma rapidly to create a strongly non-equilibrium (recombination) regime. In such a regime, the ions recombine with the electrons by a three-body process with a rate that is the highest for highly excited levels (high n-quantum number). The lower levels are populated by collisional cascading processes. Hence, in a recombining plasma the process of population occurs from higher to lower levels. At the same time, depopulation of low-n levels is predominantly by radiative (spontaneous) transitions; in hydrogen-like ions this has the highest rate for the resonance 2 to 1 transition. In this way, in hydrogen-like ions for example, a population inversion can occur for levels $n=3$ and 4 relative to level 2, with a higher gain on the 3 to 2 transition (in CVI this transition corresponds to a wavelength of 182.2 Angstroms).

Most of the research on the recombination scheme has been based on fast adiabatic cooling due to free expansion of the plasma into a vacuum or cooled gas. At the same time, there are other theoretical and experimental studies of other approaches to soft X-ray laser development with credible results, most recently from Livermore in electron - collisionally pumped neon-like Se. One advantage of the recombination scheme is a relatively rapid decrease of wavelength with (isoelectronically) increasing charge of atomic core Z of the working element. However, the disadvantages of the scheme based on plasma recombination during free expansion are the rapidly decreasing electron density, the difficulty of obtaining a relatively long and uniform plasma column and control of the cooling rate. To minimize these problems, it has been proposed to create a plasma column with a relatively large ratio of plasma length to radius (ratio greater than or equal to 100) in a strong solenoidal magnetic field and to cool it by radiation loses. See Suckewer and Fishman, "Conditions for Soft X-Ray Lasing Action in a Combined Plasma Column", J. Appl. Phys. Vol. 51, No. 4 April 1980, 1922-1931. Because the spectral line radiation losses are proportional to $Z^4$, and three body recombination is proportional to the square of electron density $n_e^2$, such cooling is believed able to produce very rapid recombination in a plasma with high enough Z and $n_e$. It is also belived that radiation cooling of a magnetically confined plasma column can be more efficient than adiabatic cooling of an expanding plasma. See Suckewer et al, "Population Inversion and Gain Measurements for Soft X-Ray Laser Development in a Magnetically Confined Plasma Column" IEEE Journal of Quantum Electronics, Vol. QE-19, No. 12, December 1983, 1855-1860. The magnetic field would prevent the radius of the column from increasing and hence prevent a rapid decrease in electron density.

The patent literature also includes discussions of efforts to produce soft X-ray lasing from plasmas. In many respects U.S. Pat. No. 3,823,235 entitled X-RAY LASER is typical of the patent prior art. A short pulse laser having a pulse length in the neighborhood of $10^{-12}$ seconds is focused by an optical network onto the end of a filament having a diameter of up to about 1 micron and a Z in the range of between 2 and 30. In this environment a short time scale is necessary in order to avoid depopulation of excited levels by spontaneous emission. That invention differs from the present invention in that the present invention operates on a much slower time scale and the approach described in U.S. Pat. No. 3,823,325 is not based on plasma recombination as defined in this disclosure.

U.S. Pat. No. 3,961,197 entitled X-RAY GENERATOR is of interest in that it includes a discussion concerning the use of a magnetic field to confine a plasma in the context of X-ray generation by laser pumping. In one embodiment a primary X-ray burst causes a mixture of high Z and low Z gases to produce coherent X-rays. The primary X-rays ionize the lasing medium. Charge-exchange with neutral atoms then produce the population inversion necessary for producing coherent secondary X-rays. Two essential features of that invention are the conversion of primary X-rays to secondary X-rays and electron transfer from low Z atoms to high Z atoms. Neither of those features are considered to be parts of the present invention.

U.S. Pat. No. 4,229,708 entitled X-RAY LASER discloses the use of the $CO_2$ laser which bombards a lithium target. The patent further discloses a variety of different elements with an atomic number Z ranging from 3 to 10 which might also be suitable. One of the materials identified as being a suitable equivalent is carbon V. There is also some discussion concerning the role of aluminum. That invention is based upon excitations of populations in metastable levels and the subsequent extraction of energy from these levels by spontaneous anti-Stokes scattering. However, the invention set forth in U.S. Pat. No. 4,229,708 is otherwise very different than the present invention. The present invention does not use the 1s2s metastable levels nor anti-Stokes Raman scattering which are an essential part of the disclosure of U.S. Pat. No. 4,229,708.

U.S. Pat. No. 3,746,860 entitled SOFT X-RAY GENERATOR ASSISTED BY LASER describes one of the earlier efforts to use a $CO_2$ laser to generate soft X-rays. That disclosure appears to be directed primarily towards the use of high Z material. The laser is used to enhance spontaneous X-ray emission. Therefore, U.S. Pat. No. 3,746,860 does not describe a true X-ray laser. The present invention, however, causes the generation of stimulated X-ray emission and is therefore absolutely different from the device described in U.S. Pat. No. 3,746,860.

U.S. Pat. No. 4,143,275 is of interest only in that it discusses the use of a wide range of high Z numbers. It primarily discloses a device for reflecting X-rays from a conventional X-ray source. The references to sources of stimulated emission involve the old idea of inner shell photo-ionization. The patent appears to be directly solely towards an apparatus for reflecting X-rays and not towards an X-ray laser as such.

Several prior art patents discuss the use of aluminum as a target or part of a target. For example, U.S. Pat. No. 3,826,996 entitled METHOD OF OBTAINING A MEDIUM HAVING A NEGATIVE ABSORPTION COEFICIENT IN THE X-RAY AND ULTRAVIOLET SPECTRAL RANGE AND A LASER FOR PRACTICAL APPLICATION OF SAID METHOD discloses the use of an aluminum target which is impinged upon by a laser beam emitted from a giant-pulse laser. That invention is based upon population inversion between metastable energy states and low energy states in a laser produced plasma. An essential characteristic is that the plasma is chosen so as to insure that there should exist metastable states which can be populated. That invention is different from the present invention in that metastable states play no role as such in the present invention.

Similarly, U.S. Pat. No. 4,504,964 entitled LASER BEAM PLASMA PINCH X-RAY SYSTEM discloses the impingement of X-rays from a plurality of laser sources onto an aluminum target.

Finally, the following patents may be of interest with regard to the generation of X-ray lasers in general, but otherwise do not appear to be relevant to the apparatus and method of the present invention: U.S. Pat. Nos. 3,484,721; 3,518,427; 3,617,929; 3,813,555; 3,864,643; 3,882,312; 3,967,213; 3,972,008; 4,012,640; 4,034,226; 4,042,827; 4,053,783; 4,058,486; 4,201,955; 4,206,364; 4,218,628; 4,317,994 and 4,380,072.

Insofar as understood none of the prior art teaches or suggests the method and apparatus of the present invention including the novel structure of the target means employed to obtain enhanced soft X-ray lasing action.

SUMMARY OF THE INVENTION

Briefly described the invention comprises a method and apparatus for generating soft X-ray lasing action in a confined plasma column. A $CO_2$ laser beam is focused on a carbon target thereby producing a plasma. A solenoid creates a magnetic field where B=90 kG which causes the plasma to assume the shape of a thin column. The target preferably comprises a carbon disc and one or more carbon blades mounted perpendicular to the surface of the disc. When the $CO_2$ laser beam strikes the surface of the disc it forms the plasma column which is cooled by radiation losses and heat conduction to the blade. The maximum enhancement of soft X-ray radiation in the axial and transverse directions has been found to be at a location which is offset from the central axis of the plasma column. Accordingly, the axial X-rays are transmitted through a slot in the carbon disc displaced by approximately 1.3 mm from the center of the plasma column for a $CO_2$ laser energy and power=300 J and $=5 \times 10^{12}$ W/cm$^2$ respectively. A mask whose role is to improve measurement of enhancement, is located parallel to the longitudinal axis of the plasma column, is also off-set by approximately 1.3 mm for viewing the transversely generated soft X-rays.

In another embodiment four blades are located at intervals of 90° with respect to each other around the plasma column. By using an even number of blades equally spaced around the periphery of the plasma column it is possible to achieve greater axial uniformity of the column and better reproducibility of results.

In still another embodiment a coating of aluminum or magnesium was placed on the carbon disc and blade. The Z of the aluminum (Z=13) or magnesium (Z=12) coating was chosen to be at least 5 greater than the Z of the carbon disc and blade (Z=6).

These and other features of the present invention will be more fully understood by reference to the following drawings.

BRIEF DESCRIPTION OF THE DRAWINGS

FIG. 9A is a graph of the CVI 182 Angstrom soft X-ray radiation generated by the bladeless embodiment of FIG. 5 as measured in the axial direction.

FIG. 9B is a graph of the CVI 135 Angstrom soft X-ray radiation generated by the bladeless embodiment of FIG. 5 and as measured in the axial direction.

FIG. 9C is a graph of the CVI 182 Angstrom soft X-ray radiation generated by the bladeless embodiment of FIG. 5 as measured in the transverse direction.

FIG. 9D is a graph of the CVI 135 Angstrom soft X-ray radiation as generated by the embodiment of FIG. 5 as measured in the transverse direction.

FIG. 9E is the equation for measuring the enhancement of the bladeless embodiment of FIG. 5.

FIG. 10A is a graph of the CVI 182 Angstrom soft X-ray radiation generated by the preferred embodiment of FIG. 2 as measured in the axial direction.

FIG. 10B is a graph of the CVI 135 Angstrom soft X-ray radiation generated by the preferred embodiment of FIG. 2 as measured in the axial direction.

FIG. 10C is a graph of the CVI 182 Angstrom soft X-ray radiation generated by the preferred embodiment of FIG. 2 as measured in the transverse direction.

FIG. 10D is a graph of the CVI 135 Angstrom soft X-ray radiation generated by the preferred embodiment of FIG. 2 as measured in the transverse direction.

FIG. 10E is the mathematical equation for the relationship between the intensity of the spectral output and the overall enhancement E of the single blade embodiment of FIG. 2.

DETAILED DESCRIPTION OF THE PREFERRED EMBODIMENT

During the coure of this description like numbers will be used to identify like elements according to the different figures which illustrate the invention.

Figure 1:
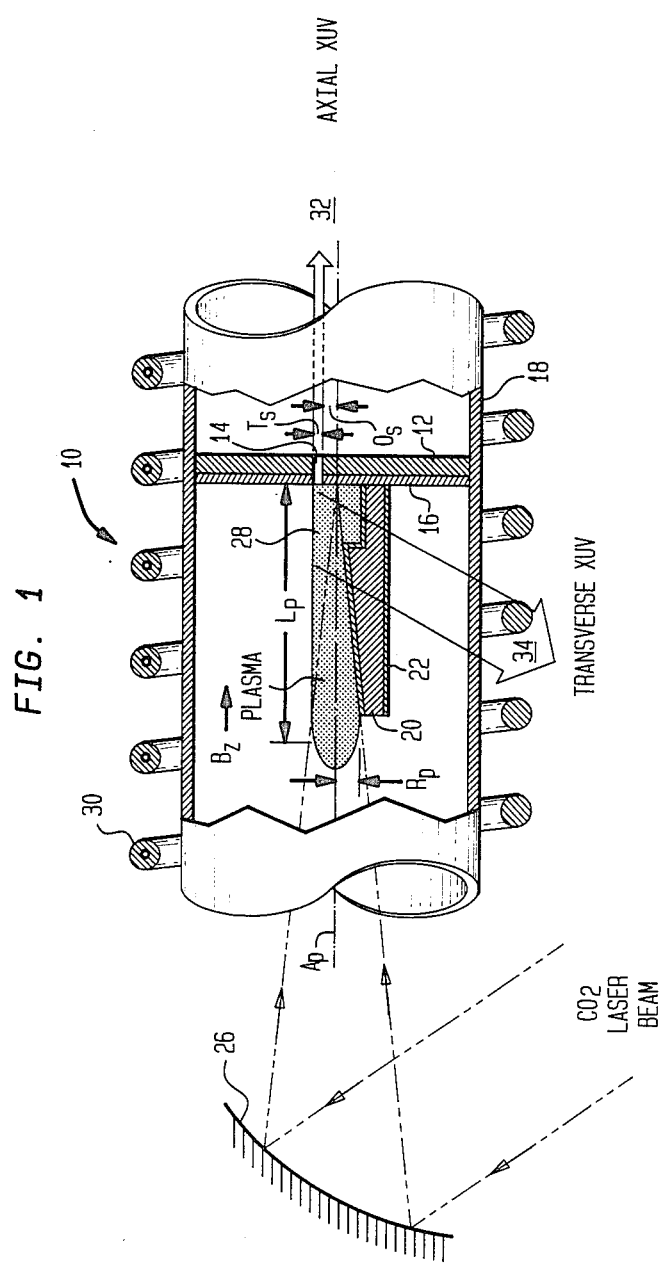
FIG. 1 is a cross-section of a side elevational view of an embodiment of the invention which incorporates a single carbon blade and in which the blade and the carbon disc target are coated with a thin layer of aluminum
Figure 2:
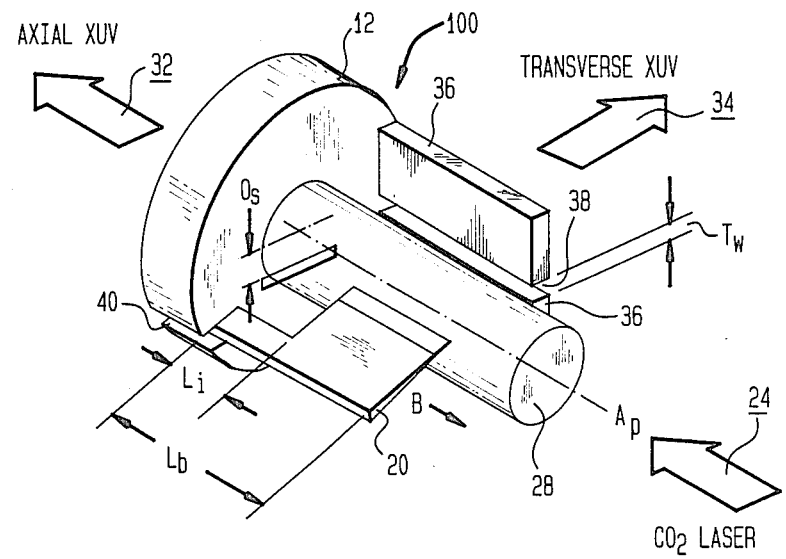
FIG. 2 is a perspective view of the preferred embodiment of the invention.

A carbon disc 12 and a single carbon blade 20 mounted perpendicular to disc 12 form the targets for a focused $CO_2$ laser beam 24. The interaction of $CO_2$ laser beam 24 on the carbon targets 12 and 20 causes the creation of plasma column 28. Carbon disc 12 includes a slot 14 having a width $T_s$ in the range of 0.8 mm and an offset $O_s$ from the central axis $A_p$ of plasma column 28 in the range of 1.3 millimeters. According to the preferred embodiment 100 of the invention as shown in FIG. 2 the disc 12 and carbon blade 20 are pure carbon. However, according to another embodiment of the invention shown in FIG. 1, a thin aluminum coating 16 covers the surface of carbon disc 12. The purpose of the aluminum coating 16 is to increase the radiation cooling effectiveness of the target. The coating 16 is preferably aluminum but could be magnesium or any other similar metal and has a thickness of approximately 1 to 2 microns. Similarly, carbon blade 20 of FIG. 1 has an aluminum coating 22 on its surface having a thickness $D_c$ in the range of 1 to 2 microns. Coating 22 further assists blade 20 in providing cooling for the plasma column 28.

Carbon disc 12 is supported by the walls 18 of the vacuum chamber. The coils 30 of a magnetic solenoid create a field $B_z$ inside container walls 18. The magnetic field $B_z$ is preferably about 90 kG and serves to shape the plasma 28 into a relatively long annular cylinder.

The $CO_2$ laser beam 24 is focused by a mirror 26 onto the surface of carbon disc 12. The resulting plasma 28, shaped by magnetic field $B_z$ extends along axis Ap. Plasma column 28 has a length $L_p$ equal to approximately 10 mm and a radius $R_p$ of approximately 1.5 mm. Soft X-rays 32 generated in the axial direction are transmitted through the slot 14 in carbon disc 12. Similarly, soft X-rays 34 generated in the transverse direction are transmitted through a window 38 in mask 36 as shown in FIG. 2. A groove 40 in disc 12 receives the shank 42 of the carbon blade such as shown in further detail in FIG. 3A.

Figure 3A:
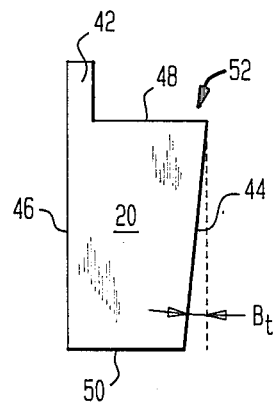
FIG. 3A is a top plan view of an uncoated carbon blade.
Figure 3B:
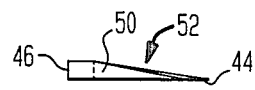
FIG. 3B is an end view of the uncoated carbon blade illustrated in FIG. 3A.
Figure 3C:
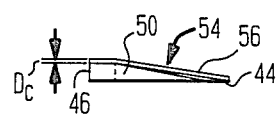
FIG. 3C is an end view of the embodiment of a carbon blade such as illustrated in FIG. 1 in which the blade includes a thin metallic coating of aluminum.

FIG. 3A illustrates the details of an uncoated carbon blade 20. However, the general geometry of a carbon blade 20 remains basically the same whether it is coated or uncoated. Each blade 20 typically includes a shank portion 42 which is received in a groove 40 in the carbon disc 12, a thin tapered edge 44 which contacts the plasma 28, a thick back portion 46 opposite thin edge 44, a base section 48 close to shank 42 and a small top portion 50 opposite base 48. The angle of taper $B_t$ is generally set at the cone angle of the incident $CO_2$ laser beam. FIG. 3B shows an uncoated blade 52 as seen from the top end 50. The overall length $L_b$ of the extension of a blade 20 beyond the surface of carbon disc 12 is approximately 20 millimeters as shown in FIG. 2. Of that 20 millimeters approximately 6 millimeters comprises the region $L_i$ of the indent portion. The six millimeter indent portion $L_i$ is provided so that measurements can be taken of the plasma column 28 without interference from the activity near the blade edge 44. A coated carbon blade 54 is illustrated in FIG. 3C. Coated blade 54 includes a thin coating of aluminum 56. having a thickness $D_c$ in the neighborhood of 1 to 2 microns. While the coating 56 is preferably aluminum it could also comprise another higher Z metal such as magnesium. Part of the invention comprehends the discovery that medium Z elements, such as aluminum, play a significant role in the process of faster radiation cooling for electron temperatures $T_e$ below 100 eV. Optimum performance is believed to occur where the underlying target material, such as carbon, has a Z equal to or greater than 5 and the coating on the carbon disc 12 or the blade 20 has a Z that is at least 5 to 7 higher than the underlying target material. Therefore, a coating of magnesium with a Z equal to 12 or aluminum where Z equals 13 would be appropriate for an underlying target such as carbon where Z equals 6.

Figure 4A:
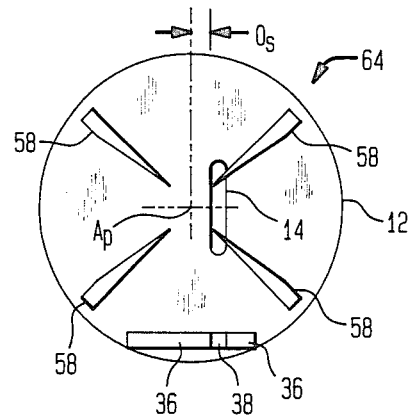
FIG. 4A is a top plan view of an alternative embodiment of the present invention incorporating four carbon blades offset at an angle of 90° with respect to each other.
Figure 4B:
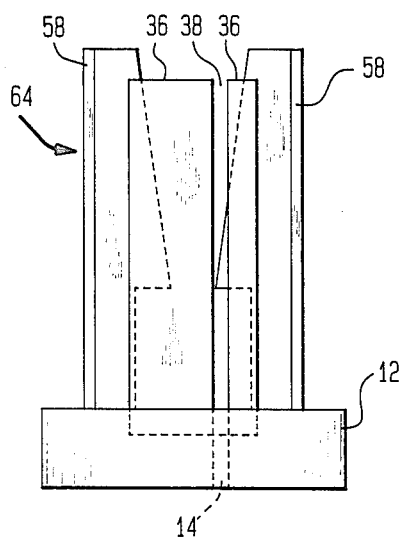
FIG. 4B is a side elevational view of the four blade alternative embodiment illustrated in FIG. 4A.

FIGS. 4A and 4B illustrate an alternative embodiment 64 of the invention employing four blades 58. The four blades 58 are located around the periphery of disc 12 and spaced at 90° intervals with respect to each other. The tapered leading edges of the blades 58 point inward toward the central axis $A_p$ of the plasma 28. As in the case of the preferred embodiment 100, the axial slot 14 and the transverse slot 38 are offset by an amount $O_s$ from central axis $A_p$. The four blade embodiment 56 has better experimental repeatability than the preferred embodiment 10 and is believed to produce better enhancement E and intensity than is possible with other embodiments. The optimum multi-blade configuration is believed to be 4 or 6. In a multiple blade configuration it is important that the total number of blades be an even number so that each blade lines up 180° across from another.

Figure 5:
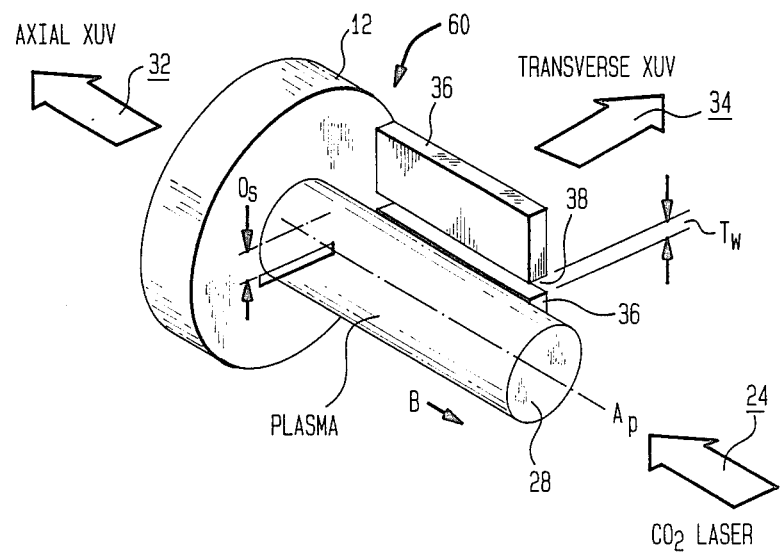
FIG. 5 is another alternative embodiment of the present invention employing no cooling blades.

A stripped down bladeless embodiment 60 is illustrated in FIG. 5. Bladeless embodiment 60 is identical to the preferred embodiment 100 illustrated in FIG. 2 except that it does not include a blade 20. Bladeless embodiment 60 is not as effective as the preferred embodiment 10, but it is superior to the prior art due to the offset $O_s$ of the axial transmission slot 14 and the slot 38 in mask 36.

Figure 6:
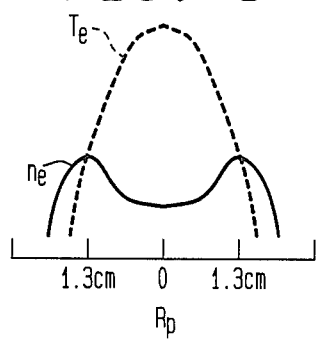
FIG. 6 is a graph showing the temperature and electron density profiles of the plasma column with respect to its central axis.

Prior to describing the outputs of the various embodiments, it is useful to understand the basic physics of the underlying phenonemon. FIG. 6 is a profile graph of the electron density and electron temperature around the central axis $A_p$ of the plasma column 28. The radial profiles of the CVI were measured with a transverse XUV duochrometer by a shot-to-shot vertical scan. The results indicated that better conditions for maximum gain should exist in the off-axis region of the plasma column. In the center of the plasma column 28, the electron temperature $T_e$ is at a maximum and decreases rapidly towards the outer region. In contrast the electron density $n_e$ reaches its maximum off axis. In this way C⁶⁺ ions are created mainly in the center of the plasma column and recombine to CVI in the outer region where $n_e$ is at a maximum and $T_e$ is significantly lower than on the axis $A_p$.

Figure 7:
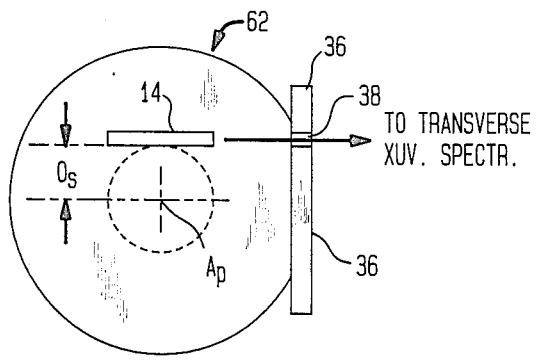
FIG. 7 schematically illustrates the locations at which measurements of axial and transverse soft X-rays were measured.
Figure 8:
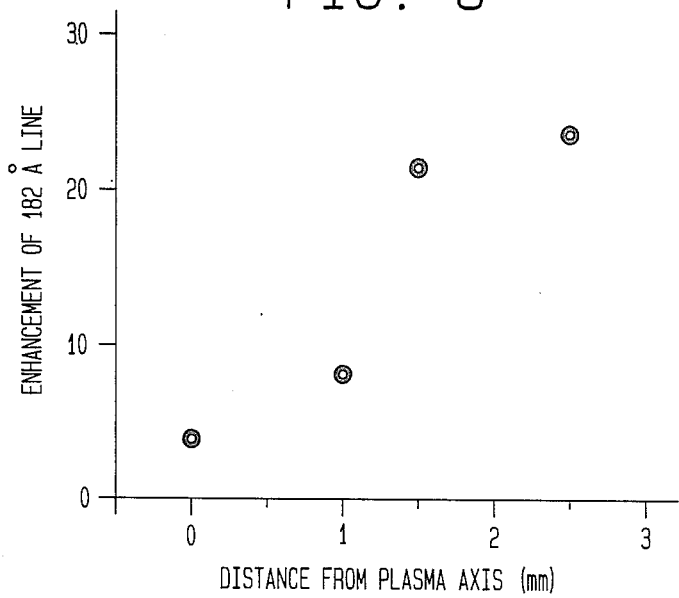
FIG. 8 is a graph illustrating the enhancement in the axial direction of the CVI 182 Angstrom line measured at different distances from the center of the plasma column for $CO_2$ laser energy 450 joules and magnetic field B=90 kG.

FIG. 8 is a graph of the enhancement obtained from the bladeless embodiment 60 as measured at various different radial points away from the central axis $A_p$ of the plasma column 28. The profile in FIG. 6 and the curve in FIG. 8 clearly indicated that maximum soft X-ray emission would be located at an off axis location, specifically 1.3 mm according to the preferred embodiment. Using this information, off axis measurements of axial and transverse soft X-rays were made and the results obtained are set forth in the graphs of FIGS. 9A-9B and 10A-10B. FIG. 7 specifically describes the locations from which axial and transverse measurements were made. In each case the plasma column 28 was created by the interaction of a 1 kJ CO₂ laser with a solid carbon target. The maximum enhancement was measured for a laser having output power of 0.3 kJ with a power density of approximately $5 \times 10^{12}$ W/cm² and a pulse FWHM of approximately 75 nanoseconds. The plasma emission in the axial direction was measured by an XUV grazing incidence monochromator equipped with a 16-stage electron multiplier, and emission in the transverse direction was measured by an XUV grazing incidence duochromator equipped with two channel electron multipliers. The rise time of the axial instrument was approximately 20 nsec and approximately twice as short for the transverse instrument. Both instruments operated in the spectral range of 10-350 Angstroms. Emission in the axial and transverse directions was simultaneously observed by two absolute intensity calibrated air monochromators. Beam splitters were utilized so that each pair of XUV and air instruments observed essentially the same region of the plasma. In this way, it was possible to use the branching ratio method to provide an in situ absolute intensity cablibration for the XUV instruments using both the laser produced plasma and, independently, a high voltage vacuum spark specifically built for calibration purposes. In addition, the relative sensitivity of the axial and transverse instruments was obtained for the CVI 182 Angstrom and the CVI 33.7 Angstrom lines by viewing simultaneously with both instruments the plasma created by the interaction of the CO₂ laser with the top of a vertical fiber. The diameter of the fiber was in the neighborhood of 70 to 300 microns. Early experiments, performed with a carbon disc having a 1.5 mm hole in the center were made. The results of those experiments were compared to the results of soft X-ray production in plasma regions located substantially off-center of the plasma axis $A_p$. It was clear from the comparison that a significant improvement in enhancement and intensity is obtainable at or near a point off axis where the electron density $n_e$ is highest and the electron temperature $T_e$ is lower than the maximum in the center of the plasma column.

Measurements of the bladeless embodiment 60 and the preferred embodiment 100 were made with carbon discs having a thickness $T_d$ of 2 mm. Each disc 12 included a horizontal slot 14 having a thickness $T_s$ of 0.8 mm and a length $L_s$ of 4 mm. The slot 14 was preferably located a distance $O_s$ of 1.3 mm below (or above) the center of disc 12. The disc 12 of the preferred embodiment 100 included a thin uncoated carbon blade 20 secured in groove 40. The blade 20 preferably extended a length Lb of 20 mm beyond the surface of the carbon disc 12. The blade edge 44 was tapered as previously described and located approximately 0.5 mm to the left of the central axis $A_p$. Each disc was mounted in the vacuum chamber 18 surrounded by solenoid magnet 30 such that the surface of the disc 12 was perpendicular to the axis of the CO₂ laser beam 24. The mask 36 including slot 38 had a width $T_w$ of 0.8 mm wide and a length $L_w$ of approximately 2 cm. Slot 38 ran parallel to the axis $A_p$ of plasma column 28 and limited the view of the transverse spectrometer to the off-axis region at the same height as the slot 14 in disc 12. A grazing incidence mirror focused light from the center of the slot 14 to the axial XUV monochromator.

The enhancement (E) of stimulated emission over spontaneous emission of the CVI 182 Angstrom line was measured in two ways and the consistency of enhancement (gain) was checked with the relative population of level n=3 obtained from measurements of intensities in axial and tranverse directions. The first method was based on the comparison of the ratio of the intensities of the CVI 182 A Angstrom line recorded simultaneously by the axial and transverse XUV instruments (First laser shot) with the ratio of the intensities of the CVI 135 Angstrom line (4 to 2 transition) also recorded simultaneously by the axial and transverse XUV instruments (seond laser shot) as follows:

$$E = \frac{I(182)_{axial}}{I(182)_{transv.}} \bigg/ \frac{I(135)_{axial}}{I(135)_{transv.}}.$$

I is the intensity of a line of a given wavelength integrated over the spectral profile and over length. The subscripts "axial" and "transv." refer to the direction of emission 32 and 34 respectively. The CVI 135 Angstrom line was chosen for such a comparison because it has the same lower level and upper level close in energy to the 182 Angstrom line. One channel of the transverse duochromator recorded the CVI 33.7 Angstrom line (2 to 1 transition) to monitor the reproducibility of CVI emission in the discharges. The contribution of the fourth order of the 33.7 Angstrom line to the 135 Angstrom line was subtracted. The transverse intensities of the 182 Angstrom and the 135 Angstrom lines compared to the 33.7 Angstrom line indicated a population inversion of levels 3 and 4 relative to level 2, hence the 182 Angstrom and the 135 Angstrom lines are not affected by optical trapping. In the transverse direction, the intensities of both lines are mainly due to spontaneous emission because of the small plasma thickness. In the axial direction, some small enhancement of the CVI 135 Angstrom line is expected from theoretical calculations (in the order to E=approximately 1.5-2) and can be taken into account by the second method described below.

In the second method the intensity of a given line in the axial direction relative to the same line in the transverse direction, after adjustment for the contribution of the CVI 182 Angstrom line intensity along the column and its approximate radial profile, was compared using the relative intensity calibration data from spark and vertical fiber plasma as follows:

$$E = \frac{I(182)_{axial} \times V^{-1}_{axial}}{I(182)_{transv.} \times V^{-1}_{transv.}}.$$

where V is the volume of the plasma observed by the axially and transverse XUV monochromators.

The enhancement, E, is related to the one-pass gain, G, averaged over line profile by the following equation:

$$E = (\exp G - 1)/G.$$

In order to find the radial region of the plasma column with the maxium one-pass gain, G, the $CO_2$ laser was focused on the bladeless target embodiment 60 at different radial positions. FIG. 8 illustrates the results of those measurements for B=90 kG and laser energy $P_1$ of approximately 450 Joules. It is clear from a review of the graph of FIG. 8 that enhancement rises rapidly near $R_p$ of approximately 1.5 mm. For lower laser energy, wherein $P_1$ is approximately 300 Joules it was noted that the maximum enhancement was observed in a relatively thin cylindrical shell having a radius of 1.3 to 1.5 mm with enhancements close to 10 where R=0.

FIGS. 9A, 9B, 9C and 9D show the intensities of the 182° and 135° Angstrom lines measured in the axial and transverse directions. The intensity of the CVI 33.5 Angstrom line and $CO_2$ power were similar for both shots. The energy of the $CO_2$ laser was $P_1$ approximately 300 Joules and a magnetic field intensity B=90 kG. The $CO_2$ laser was focused at r=1.3 mm from the edge of the slot 14 on the disc 12, which corresponded to the maximum enhancement region. The maximum enhancement E=approximately 100 was measured from intensity ratios of the 182 Angstroms and 135 Angstrom lines in the axial and transverse directions at the time of the peak intensity of the 182 Angstrom line. Knowing the enhancement it was possible to calculate the gain of approximately G=6.5 from the relationship previously described.

In the single thin blade embodiment 100, the intensities of the 182 Angstrom and 135 Angstrom lines increased typicaly by a factor of 4 in the axial direction. However, the enhancement E (i.e. gain) of the 182 Angstrom line did not increase. FIGS. 10A–10D illustrate a series of measurements of the time evolution of CVI 182 Angstrom and CVI 135 Angstrom line intensities in axial and transverse directions for the carbon disc 12 with a carbon blade 20 target preferred embodiment 100. The enhancement E=approximately 95 for the CVI 182 Angstrom line (corresponding to a gain of G=approximately 6.5) was measured by the method first described. The intensity and time behaviour of the CVI 33.7 Angstrom line was reproducible for both laser shots. Due to the increased intensity of the 135 Angstrom line, the effect of background radiation was much smaller than with the no blade embodiment 60 illustrated by FIGS. 9A–9D. The transverse instrument viewed 5 mm of plasma length (the region 1–6 mm from the disc surface), where intensity of the CVI line was strongest. Measurement of the CVI line intensities at different distances from the carbon disc 12 (using a 1 mm wide vertical mask) revealed that the effective length of the plasma column 28 where the CVI ion density was sufficiently large and uniform to produce significant gain, was $l_{eff}$=approximately 1 cm. The enhancement measured by the second method was E=approximately 120, or about a 25% higher enhancement than measured by the first method. This relatively small difference is due to the enchancement E=approximately 1.3 (G=approximately 0.5) of the CVI 135 Angstrom line (measured by the second method). Demonstration of the amplification of stimulated emission at 182° was made using a normal incidence XUV multilayer spherical mirror. In these experiments four blade embodiment 56 was used. It was also demonstrated that the four blade embodiment had better reproducibility of results and therefore it is expected that embodiments having an even number of blades will probably produce superior enhancements and intensitites over other embodiments.

The following table summarizes the major experimental parameters employed for producing the enhanced soft X-ray lasing action described in this specification.

| TABLE OF VALUES | | |
|---|---|---|
| PARAMETER | VALUE | ACCEPTABLE RANGE |
| $L_s$ | 4 mm | 1–8 mm |
| $T_s$ | 0.8 mm | .2–1.2 mm |
| $O_s$ | 1.3 mm | 0.5–2.0 mm |
| $R_p$ | 1.5 mm | 1–3 mm |
| $L_p$ | 10 mm | 5–20 mm |
| $T_d$ | 2 mm | 1–10 mm |
| $L_b$ | 20 mm | 5–25 mm |
| $B_t$ | 0.7 mm | 0.5–1.0 mm |
| $T_w$ | 0.8 mm | 0.2–1.2 mm |
| $D_c$ | 1–2 microns | 0.5–5 |
| $L_i$ | 6 mm | 3–10 mm |
| $L_w$ | 20 mm | 10–25 mm |
| $T_e$ | 15 eV | 5–25 eV |
| Disc Diameter | 9.5 mm | 5–25 mm |
| Magnetic Field B | 90 kG | 50–150 kJ |
| Laser Energy $P_1$ | 0.3 kJ | 0.1–1 kJ |
| Laser Intensity | $5 \times 10^{12}$ W/cm$^2$ | $10^{12}$–$10^{13}$ W/cm$^2$ |
| Laser Pulse FWHM | 75 n sec. | 25–100 ns |

In summary, an enhancement of stimulated emission over spontaneous emission larger than E=100 (one-pass gain G=6.5) for the CVI 182 Angstrom line in a magnetically confined, recombining plasma was obtained. The enhancement (averaged over the spectral line profile) was measured at a distance R=1.3 to 1.5 mm from the column axis $A_p$ by two independent techniques. Independent proof of amplification of stimulated emission was obtained using an XUV mirror.

There are other changes that could be made to the invention given the foregoing description. For example, while a $CO_2$ laser beam has been described it is believed that beams from other laser sources, such as Nd:glass would be acceptable as well. Moreover, target materials other than carbon and coating materials other than aluminum or magnesium should also produce improved results. However, it is believed important that the coating material have a Z at least 5–7 greater than the Z of the underlying substrate material.

While the invention has been described with reference to the preferred embodiment thereof it will be appreciated by those of ordinary skill in the art that changes can be made to the structure and the function of the invention without departing from the spirit and scope thereof.

We claim:

1. A soft X-ray laser apparatus comprising:
   a target having a Z equal to or greater than 5;
   laser beam producing means for producing a laser beam to impinge upon said target and create a plasma;
   magnetic field means for confining said plasma substantially in the shape of a column; and,
   radiator means for contacting said plasma and for reducing the temperature of free-electrons in said plasma by heat conduction and radiation, said radiator means comprising at least one blade having an edge for contacting said plasma column, wherein said plasma column has a central axis $A_p$ and said target includes a slot therein for permitting the axial transmission of X-rays from said plasma column, said slot being offset by a predetermined distance $O_s$ from said central axis $A_p$ of said plasma column.

2. The apparatus of claim 1 wherein said blade has a coating with a Z having a value that is at least 5 greater than the Z of said target.

3. The apparatus of claim 2 wherein said target comprises a carbon target.

4. The apparatus of claim 3 wherein said blade comprises a carbon blade.

5. The apparatus of claim 4 wherein said blade coating comprises an aluminum coating.

6. The apparatus of claim 1 wherein said radiator means comprises a plurality of blades each having an edge for contacting said plasma.

7. The apparatus of claim 6 wherein said radiator means comprises four blades each having an edge.

8. The apparatus of claim 1 wherein said laser beam comprises a high power $Co_2$ laser beam.

9. A soft X-ray laser apparatus comprising:
means for creating a plasma column having a central axis $A_p$ in which X-ray lasing action takes place, said means for creating a plasma column including a means for producing a laser beam, a target for impingement by said laser beam to produce a plasma and magnetic field means for generating a magnetic field to form said plasma into a column; and,
at least one aperture in said target offset by a distance $O_s$ from said central axis $A_p$ for transmitting X-rays generated from the region of maximum enhancement of stimulated X-ray generation with respect to spontaneous X-ray generation within said plasma column.

10. The apparatus of claim 9 wherein said target comprises a material having a Z equal to or greater than 5 and a surface substantially perpendicular to the axis of said laser beam.

11. The apparatus of claim 10 further including blade means having an edge which extends into said plasma column for radiation and conduction cooling of said plasma column.

12. The apparatus of claim 11 wherein said blade means comprises a plurality of blades located at equal intervals around the central axis $A_p$.

13. The apparatus of claim 9 wherein said target includes a coating of materials having a Z at least 5 greater than the Z of said target.

14. The apparatus of claim 13 wherein:
said means for creating a laser beam comprises a $CO_2$ laser; and,
said target comprises a carbon target; and,
said coating comprises an alumninum coating.

15. A method of generating soft X-rays comprising the steps of:
providing a laser beam;
impinging said laser beam on a target to create a plasma;
forming said plasma into a column having a central axis $A_p$ in which X-ray lasing action takes place;
cooling said plasma by radiation and heat conduction by placing the edge of at least one blade-like object into said plasma column; and,
transmitting a portion of said X-rays through an aperture in said target offset by a predetermined amount from said central axis $A_p$ where the enhancement of stimulated X-ray emission is at a maximum with respect to spontaneous X-ray emission.

16. The method of claim 15 further including the step of:
coating said target with a thin metal layer having a Z at least 5 greater than the Z of said target.

17. The method of claim 15 further including the step of:
coating said blade with a thin metal layer having a Z at least 5 greater than the Z of said blade.

18. A soft X-ray laser apparatus comprising:
a target;
laser beam producing means for producing a laser beam to impinge upon said target and create a plasma;
means for confining said plasma and shaping said plasma substantially into the shape of a column having a central axis $A_p$;
radiator means for contacting said plasma and for reducing the temperature of free electrons in said plasma column by heat conduction and radiation, said radiator means comprising at least one blade having an edge for contacting said plasma column; and,
an output means including at least one aperture offset by a distance $O_s$ from said central axis $A_p$ for transmitting X-rays generated from the region of maximum enhancement of stimulated X-ray generation with respect to spontaneous X-ray generation within said plasma column.

* * * * *